United States Patent
Haug

(10) Patent No.: US 9,882,187 B2
(45) Date of Patent: Jan. 30, 2018

(54) BATTERY CELL, BATTERY, OR BATTERY CELL MODULE, METHOD FOR PRODUCING A BATTERY CELL, AND MOTOR VEHICLE

(75) Inventor: Karsten Haug, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 993 days.

(21) Appl. No.: 14/123,545

(22) PCT Filed: May 29, 2012

(86) PCT No.: PCT/EP2012/059963
§ 371 (c)(1),
(2), (4) Date: Apr. 11, 2014

(87) PCT Pub. No.: WO2012/163886
PCT Pub. Date: Dec. 6, 2012

(65) Prior Publication Data
US 2014/0295239 A1    Oct. 2, 2014

(30) Foreign Application Priority Data
Jun. 3, 2011 (DE) .................. 10 2011 076 919

(51) Int. Cl.
H01M 2/26 (2006.01)
H01M 10/655 (2014.01)
H01M 2/10 (2006.01)
H01M 2/02 (2006.01)
H01M 2/04 (2006.01)
H01M 10/02 (2006.01)
H01M 10/04 (2006.01)
H01M 10/0525 (2010.01)
H01M 2/30 (2006.01)
H01M 10/625 (2014.01)
H01M 10/6554 (2014.01)
H01M 10/613 (2014.01)

(52) U.S. Cl.
CPC ......... *H01M 2/1083* (2013.01); *H01M 2/024* (2013.01); *H01M 2/027* (2013.01); *H01M 2/028* (2013.01); *H01M 2/0439* (2013.01); *H01M 2/263* (2013.01); *H01M 2/30* (2013.01); *H01M 10/02* (2013.01); *H01M 10/04* (2013.01); *H01M 10/0525* (2013.01); *H01M 10/613* (2015.04); *H01M 10/625* (2015.04); *H01M 10/655* (2015.04); *H01M 10/6554* (2015.04); *Y02E 60/122* (2013.01); *Y02P 70/54* (2015.11); *Y02T 10/7011* (2013.01); *Y10T 29/4911* (2015.01)

(58) Field of Classification Search
CPC combination set(s) only.
See application file for complete search history.

(56) References Cited

U.S. PATENT DOCUMENTS

| 3,960,599 | A | 6/1976 | Reynier et al. |
| 4,623,599 | A | 11/1986 | Vourlis |
| 5,807,644 | A * | 9/1998 | Blonsky ............... E02D 31/02 429/162 |
| 7,597,994 | B2 | 10/2009 | Kozu et al. |
| 2005/0164080 | A1* | 7/2005 | Kozu .................. H01M 2/105 429/176 |
| 2010/0203373 | A1* | 8/2010 | Kawase ............. H01M 2/0262 429/94 |

FOREIGN PATENT DOCUMENTS

| DE | 44 20 207 C1 | 8/1995 |
| DE | 196 47 593 A1 | 5/1998 |
| DE | 10 2008 015 965 A1 | 9/2009 |
| JP | 2003-323869 A | 11/2003 |
| JP | 2009-245730 A | 10/2009 |
| JP | 2009-289448 A | 12/2009 |
| WO | 2010/146154 A2 | 12/2010 |
| WO | 2011/012201 A1 | 2/2011 |

OTHER PUBLICATIONS

International Search Report corresponding to PCT Application No. PCT/EP2012/059963, dated Aug. 16, 2012 (German and English language document) (7 pages).

* cited by examiner

*Primary Examiner* — Ladan Mohaddes
(74) *Attorney, Agent, or Firm* — Maginot, Moore & Beck LLP

(57) ABSTRACT

A battery cell, in particular a lithium ion battery cell, includes a housing and at least one electrode assembly in the housing. The electrode assembly includes electrode assembly electrodes that are arranged in more than two layers in a cross-section in the housing. The housing has at least two housing elements that substantially separate the electrode assembly from the environment. A first housing element is electrically connected to the positive pole of the electrode assembly and a second housing element is electrically connected to the negative pole of the electrode assembly such that the battery cell is configured to be electrically contacted at the first housing element and at the second housing element. A battery or a battery cell module includes several of the battery cells. A method is implemented to produce the battery cell and a motor vehicle includes the battery cell.

13 Claims, 4 Drawing Sheets

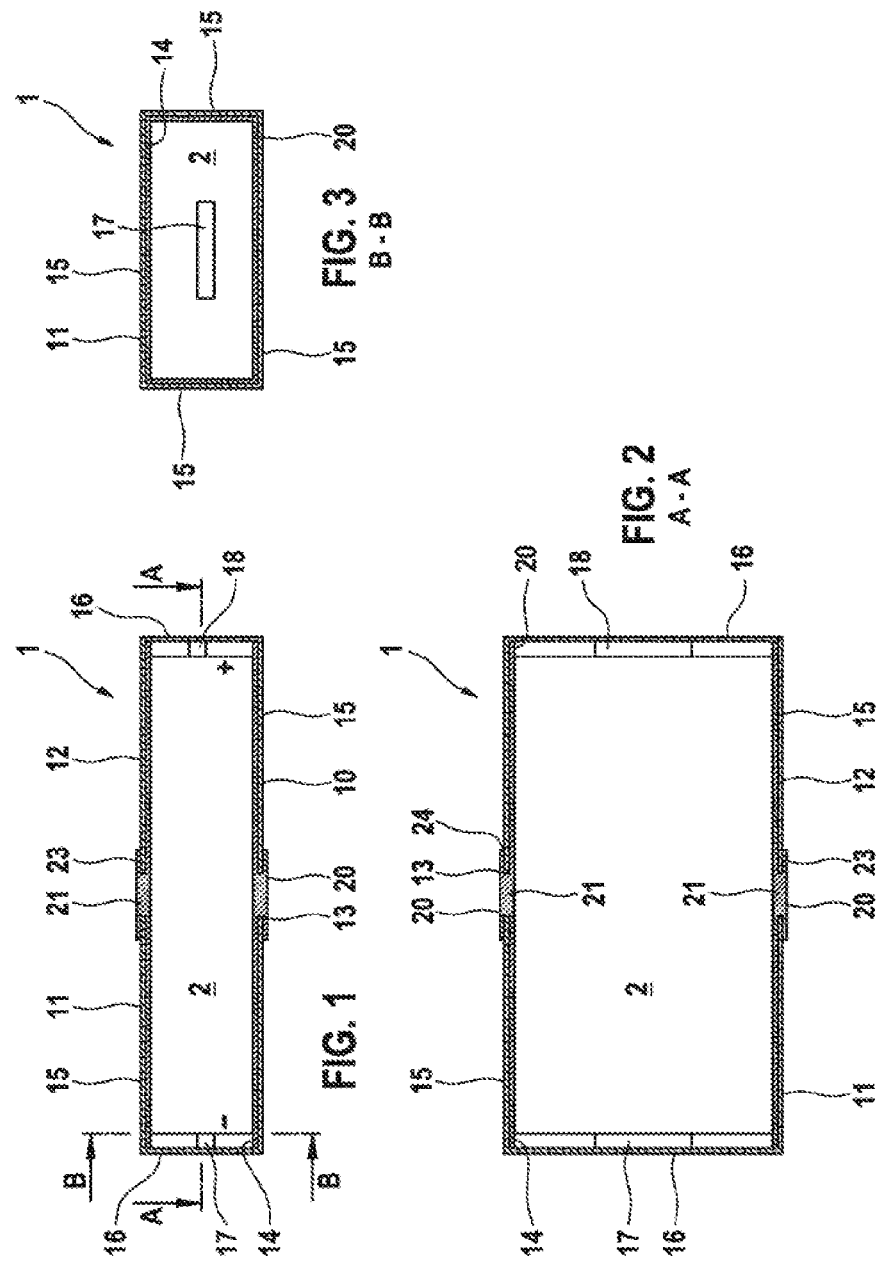

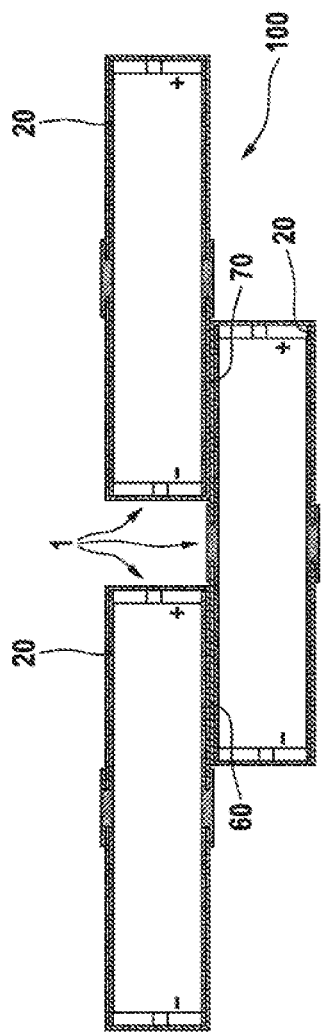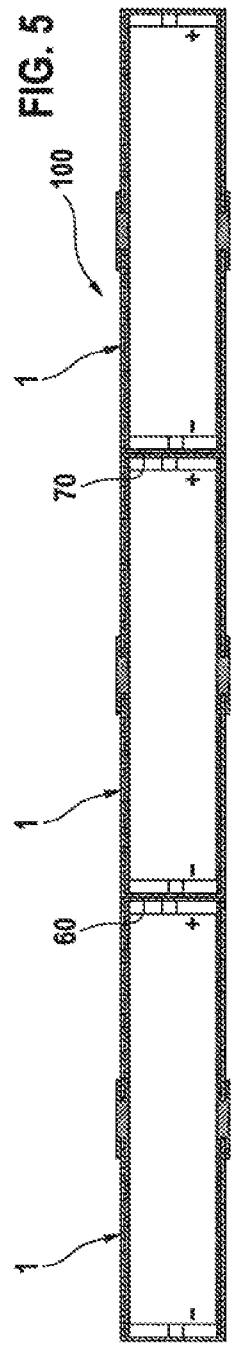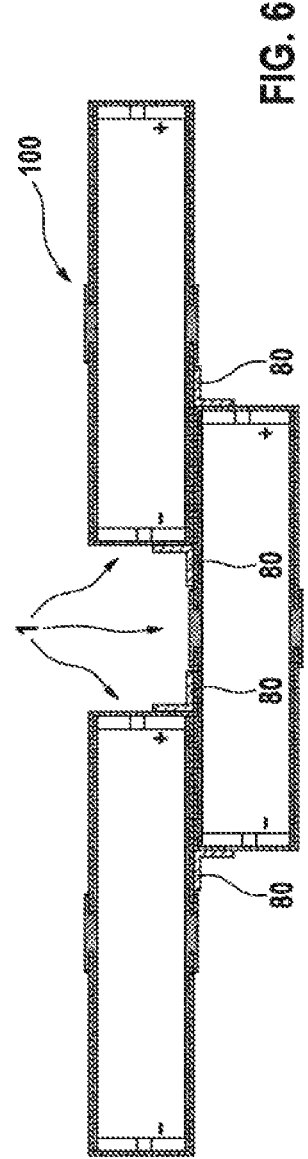

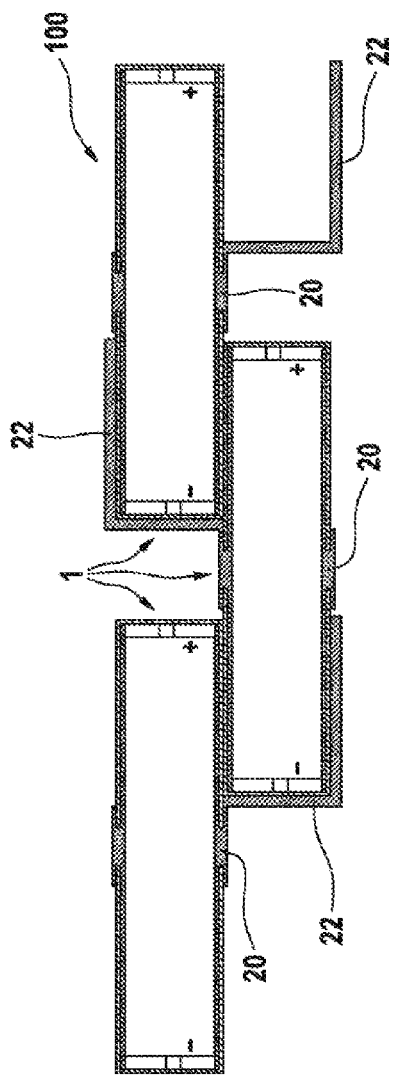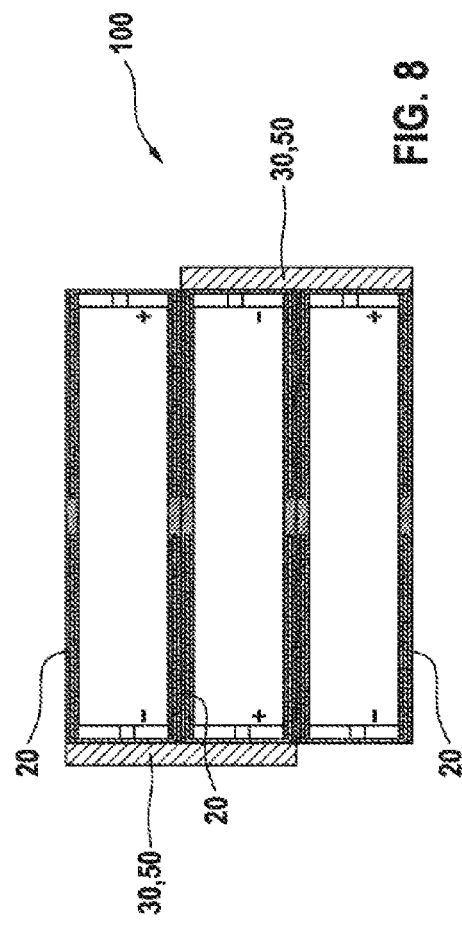

BATTERY CELL, BATTERY, OR BATTERY CELL MODULE, METHOD FOR PRODUCING A BATTERY CELL, AND MOTOR VEHICLE

This application is a 35 U.S.C. § 371 National Stage Application of PCT/EP2012/059963, filed on May 29, 2012, which claims the benefit of priority to Serial No. DE 10 2011 076 919.6, filed on Jun. 3, 2011 in Germany, the disclosures of which are incorporated herein by reference in their entirety.

BACKGROUND

The present disclosure relates to a battery cell and to a battery or a battery cell module which comprises a number of the battery cells according to the disclosure. The present disclosure also relates to a method for producing a battery cell according to the disclosure and to a motor vehicle.

The present disclosure particularly concerns lithium-ion battery cells and lithium-ion batteries or corresponding battery cell modules.

Such lithium-ion cells usually comprise an electrode which allows the reversible insertion of ions in a process known as intercalation and their extraction again in a process known as deintercalation. The intercalation takes place during the charging process of the battery cell and the deintercalation takes place during the discharging of the battery cell for supplying power to electrical units.

DE 10 2008 015 965 A1 discloses a galvanic element with a foil seal which is designed as an energy store for chip cards. The galvanic element is a primary battery. This galvanic element merely comprises two electrode layers that are separated by a separator. The respective electrode layers contact copper plates, which partially form the housing of the galvanic element. On account of the low capacitance and the lack of rechargability, the galvanic element presented in this document is not suitable for use in the automotive sector. Furthermore, on account of the purely planar structure, the construction presented cannot be used for the stacked electrodes (known as the stack principle or pouch cells) or rolled electrodes (jelly roll) with lateral contacting that are customary in automobile applications.

U.S. Pat. No. 7,597,994 B2 discloses a battery in which a substantially conventional battery cell has a casing that is formed by an upper shell and a lower shell.

Electrical contacting of the battery cell can take place through clearances in this casing. The casing is made of a non-conducting material and accordingly acts as an electrical insulator and also as a guard against mechanically induced damage.

Conventional lithium-ion batteries often have design features that have noticeable adverse effect in terms of the effort involved in production and the associated production costs. With respect to the individual battery cell, there is for example the necessary leading through the battery housing of an electrical connection between the electrodes in the battery cell housing and the respective pole binders or terminals. This often makes it necessary to insulate the one-part battery housing from at least one pole of such an electrode-terminal connection. The fixed arrangement of the pole binders or terminals on specific sides of the battery cells means that they only have a low degree of flexibility with regard to the interconnection of a number of battery cells to form a battery cell module. In the case of the battery cells, in which the housing is at the potential of one pole, an additional insulation of the cell housing, for example by varnishing or encapsulation in plastic, has to be provided for the purposes of insulation for a series connection.

SUMMARY

The disclosure provides a battery cell, and in particular a lithium-ion battery cell, which comprises a housing and, in the housing, at least one electrode assembly, in which electrodes are arranged in more than two layers in a cross section, the housing having at least two housing elements that substantially separate the electrode assembly from the surroundings. According to the disclosure, it is provided that a first housing element is electrically connected to the positive pole of the electrode assembly and a second housing element is electrically connected to the negative pole of the electrode assembly, so that the battery cell can be electrically contacted on the first housing element and on the second housing element. In this case, one or more electrode assemblies can be arranged in the housing. Such an electrode assembly may for example take the form of what is known as a jelly roll, that is to say a wound arrangement in which two electrodes and a separator arranged in between form three layers, so that in a section through this roll it has significantly more than two electrode layers although it only comprises two electrodes. In the case of an arrangement of the electrodes in what is known as a stack, a multiplicity of electrodes are arranged alternately one behind the other, so that such an electrode assembly consequently likewise has electrodes in more than two layers in a cross section. The battery cell according to the disclosure is preferably what is known as a secondary battery, that is to say it is designed to be rechargeable. The first and second housing elements together form the outer side of the battery cell, via which the electrical contact with the battery cell can be established, so that the battery cell can be charged and discharged via the first and second housing elements. That is to say that the housing elements form the terminals of the battery cell. An important aspect of the present disclosure is therefore the continuation of the electrical insulation of the two poles of the electrode assembly on the housing level. This makes it possible to dispense completely with lead-throughs of the poles or the terminals from the electrode assembly through the housing in an insulated or uninsulated form. The effort involved in production is correspondingly less, and accordingly so too is the cost. As a result of the potential being applied to the housing elements, the battery cells according to the disclosure are much more flexible than conventional battery cells in the way that they can be interconnected to form a battery cell module or a battery, since the battery cells according to the disclosure can be contacted anywhere on the housing elements. Also, the costs for the electrical lead-through through the housing and the insulation there of one or both electrodes with respect to the housing no longer arise. Furthermore, as a result of the design according to the disclosure, the necessary costs in the case of conventional battery cells for the electrical insulation of the cell housing from the electrodes or the extra connection of the housing to an electrode no longer arise. Ways of cooling the battery cell according to the disclosure are easily and efficiently possible directly on the housing elements, with good heat transfer to the electrode assembly. In this respect, it must be ensured that the two housing elements are not short-circuited via the heat sink.

The first housing element and the second housing element are preferably respectively designed substantially in the form of a half-shell, the open sides thereof being aligned in relation to one another and the battery cell also comprising at least one electrical insulating element, which is arranged between the housing elements, and with which an electrical short-circuit between the first housing element and the second housing element can be prevented. The housing elements are in this case preferably of a substantially prismatic configuration, the electrical contact between the electrode assembly and the respective housing half preferably taking place on sides of the housing that are facing away from one another, that is to say on end faces of the housing that are formed by the housing elements. For reliable insulation of the housing elements, the insulating element may be arranged between the end faces of the open side of the housing elements in what is known as an insulating face, although the disclosure is not restricted to this design and it may instead also be provided that the housing elements are spaced apart from one another and are merely mechanically bridged by the insulating element. The two housing elements, which are formed as half-shells, may be used directly as poles or as terminals, providing a wide variety of possibilities for the electrical interconnection and cooling of the battery cell, since, for example in the case of cuboidal half-shells, they can be contacted on five out of six sides of the respective prismatic half-shell cuboid. In the case of generally prismatic half-shells with N sides, it is possible for contacts to be established on N-1 faces, since only the insulating face cannot be contacted.

For the purposes of the disclosure, half-shells are meant to mean hollow bodies that are open at least on one side, in which the open side is preferably formed in one plane.

In a preferred design variant, it is provided that, at least in certain regions, the insulating element reaches as far as the inner side of at least one housing element, so that in this region the insulating element provides an electrical insulation between the housing element and the electrode assembly. That is to say that the insulating element already mentioned may serve not only for the insulation between the housing elements but also for the insulation of the housing from the electrode assembly, and consequently for preventing the housing element to which potential is applied from contacting the other pole, respectively, of the electrode assembly. Such an insulating element is advantageously of just a one-part design, so that the production and assembly thereof can be easily carried out. Furthermore, the insulating element may surround the housing, in a further expedient design the respective housing element apart from one or more side faces or end faces or regions thereof, it being possible for the non-insulated regions to serve for the contacting of the respective housing element. That is to say that an insulating element serving for the insulation of the electrode assembly in the battery cell may at the same time serve as an external insulator of the battery cell according to the disclosure.

In a further advantageous design of the battery cell according to the disclosure, it may be provided that it has on at least one housing element a heat sink that electrically contacts said element. The heat sink may in this case also undertake the function of a cell connector. This allows large conduit cross sections and efficient cooling to be made possible, since the cooling effect is provided directly on the current-carrying parts, with good heat transfer characteristics with respect to the cell.

The disclosure also provides a method for producing a battery cell, and in particular a method for producing a lithium-ion battery cell, the battery cell comprising at least one electrode assembly, in which electrodes are arranged in more than two layers in a cross section. It is provided according to the disclosure that the respective electrode assembly is introduced into a substantially tubular insulating element and a first and a second substantially half-shell-shaped housing element are slipped over the insulating element, on both open end faces thereof, and over the electrode assembly, and the two housing elements are electrically insulated from one another, and that an electrical contact is established between the positive pole of the electrode assembly and the first housing element and an electrical contact is established between the negative pole of the electrode assembly and the second housing element. The establishment of the electrical contact between the electrode assembly and the housing element may take place for example from the outside by welding, in particular at an overlapping joint, so that sealing integrity is ensured.

With a number of electrode assemblies arranged in one housing, they can be introduced together into a tubular insulating element or be introduced respectively into a tubular insulating element and then, as described above, be brought into electrical contact with the housing elements.

The filling of the battery cell with the electrolyte may take place in a classic way through a separate opening. This opening may be located in the insulating element and can be easily closed by welding or tightly fitting a plastic plug. In comparison with conventional battery cells with openings in metal housings, a cost advantage is thereby likewise obtained.

The disclosure also provides a battery or a battery cell module which comprises a number of the battery cells according to the disclosure.

Such a battery or battery cell module may be designed in such a way that housing elements of a number of battery cells are connected to one another in an electrically conductive manner by a material bond. That is to say that, for example, a second housing element of a first battery cell is connected in an electrically conductive manner to a first housing element of a second battery cell, for example by means of welding, plug-in insertion or adhesive bonding.

In an alternative embodiment, it is provided that a battery according to the disclosure or a battery cell module according to the disclosure is designed in such a way that housing elements of a number of battery cells are connected to one another in an electrically conductive manner by a positive and/or nonpositive connection. That is to say that these battery cells may for example be screwed, riveted or inserted or else may for example be connected to one another by means of a tongue-and-groove connection. The great number of possible connecting techniques on a great number of faces of the battery cell housing means that module construction is possible with a high degree of flexibility, since half-shell-shaped housing elements can be connected to one another on five bounding faces and/or can be cooled there. This allows almost any desired two-dimensional or three-dimensional arrangements. As a result, adaptation to extremely varied installation spaces in vehicles is easily possible. In spite of the reduction in the number of individual components of a battery cell, and accordingly a module, at the same time the flexibility thereof for the construction of battery modules or batteries is significantly increased. This results in price advantages in terms of the structural design, material consumption, assembly and maintenance or recycling. This applies both when there is a series connection and when there is a parallel connection of cells.

The housing elements may be connected to one another directly or connected to one another indirectly. In the case of direct connection, the housing elements lie directly against one another and contact one another directly. In the case of an indirect connection, it is provided that the housing elements are connected to one another by means of a connecting element, which may possibly at the same time have a cooling function.

Also provided in addition is a motor vehicle, in particular an electromotively driven motor vehicle, which has at least one battery cell according to the disclosure or a battery according to the disclosure or a battery cell module according to the disclosure.

BRIEF DESCRIPTION OF THE DRAWINGS

Exemplary embodiments of the invention disclosure are explained in more detail on the basis of the description that follows and the drawings, in which:

FIG. 1 shows a battery cell according to the disclosure in a sectional view from above, FIG. 2 shows a sectional view of the battery cell according to the disclosure along the sectional profile A-A from FIG. 1, FIG. 3 shows a sectional view of the battery cell according to the disclosure along the sectional profile B-B represented in FIG. 1, FIG. 4 shows a battery cell module with battery cells welded in an overlapping manner, FIG. 5 shows a battery cell module with battery cells welded one behind the other, FIG. 6 shows a battery cell module with battery cells fastened in an overlapping manner by means of angular elements, FIG. 7 shows a battery cell module with battery cells clamped in an overlapping manner by means of extensions of the insulating element, FIG. 8 shows battery cells arranged one above the other, which are electrically connected by means of connecting elements.

DETAILED DESCRIPTION

Figure 9:
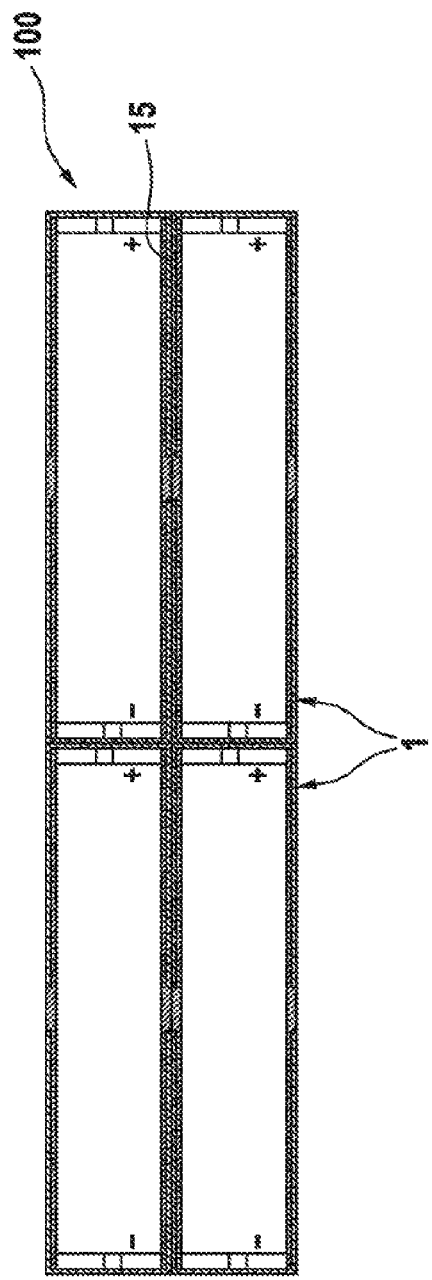
FIG. 9 shows battery cells arranged in series and parallel connection directly to form a battery cell module.

In the exemplary embodiments represented, half-shells 11, 12 are used as housing elements, the disclosure not being restricted to the use of half-shells 11, 12 as housing elements.

FIGS. 1 to 3 show the basic construction of a half-shell battery cell 1. The construction is described on the basis of the assembly sequence.

Firstly, the electrode assembly 2 in the form of what is known as a jelly roll or a pouch stack is introduced through one of the two openings into the insulating element 20 serving as a half-shell insulator. The material thereof is preferably a plastic.

The electrical connections of the electrode assembly 2 are respectively facing the open sides 13 of the insulating element. If need be, there may also be an adapter element (not represented), which makes the electrical contacting of the electrode assembly 2 to the half-shell 11, 12 easier.

In the ideal case, however, the contacting takes place directly.

The two half-shells 11, 12 are slipped over the insulating element 20. The sealing effect takes place either directly through the contact area between the plastic of the insulating element 20 and the metal of the half-shell 11, 12 by means of cold pressing or by just slipping over, with later heating and/or adhesive bonding, so that in this way a sealed positive connection is obtained. As a result, the housing 10 of the battery cell 1 is produced.

On the end faces 16 lying opposite their respective opened side, the two half-shells 11, 12 preferably have clearances, or at least guides, which make it possible for the contacting zone of the electrode assembly 2 to be accurately positioned. The contacts 17, 18 are made by welding or other classic connecting techniques, such as for example soldering, plug-in insertion, conductive adhesive bonding and the like. Direct through-welding is also possible. This has the advantage that no sealing problems are likely. After this step, the respective half-shell 11, 12 is electrically at the potential of the electrode that is electrically conductively connected to it, which is indicated by the respective plus sign or minus sign.

The filling of the battery cell 1 with the electrolyte may take place in a classic way through a separate opening. This opening may be located in the insulating element 20 and can be easily closed by welding/tightly fitting a plastic plug. In comparison with conventional battery cells, assembly is thereby made easier and accordingly less costly.

The insulating element 20 may be produced from an electrically non-conducting material, such as for example from a plastic with a high water and gas impermeability factor. For this purpose, special barrier films may be introduced into the plastic or coat the plastic.

The insulating element 20 provides a highly resistive separation of the two half-shells 11, 12. It may in this case be taken as far as the outer sides of the half-shells 11, 12, where in the region of a joining zone 24 it establishes a mechanical connection to the half-shells 11, 12 and between the half-shells 11, 12, possibly by an external clamping 23 by means of a positive and/or nonpositive connection, and at the same time can undertake a sealing function. This component part of the insulating element 20 may be referred to as an insulating bridge 21.

In the case of adhesively bonded connections between the half-shell 11, 12 and the insulating element 20, it is possible to dispense with the positive and/or nonpositive connection.

The sealing then takes place directly with respect to the insulating bridge 21. In a variant that requires an insulation of the faces of the half-shells 11, 12, the insulating element 20 may cover the respective half-shell 11, 12 on the outside and/or the inside. Then all of the faces of the battery cell 1 apart from the faces contacting the electrode assembly 2 are insulated. Alternatively, various external geometries or clearances of any desired form may be present for the electrical contacting.

The half-shells 11, 12 preferably consist of a suitable aluminum or copper alloy or high-grade steel or other conductive materials with corrosion resistance with respect to the electrolyte.

In a first configurational variant, both half-shells 11, 12 consist of an aluminum alloy. This provides advantages in the later interconnection of the battery cells 1 to form modules 100, since it is not necessary to connect different materials. One half-shell may in this case be coated on its inner side with copper or be constructed from a copper-aluminum alloy in two layers, in order to prevent contact corrosion at the transition between the copper-containing electrode assembly and a half-shell-shaped housing element.

However, as far as possible, electrical connection between the half-shell 11, 12 of an aluminum alloy and the copper-based electrode assembly 2 should not be wetted by the electrolyte. For this purpose, the lead-through of the copper contact via passing through the half-shell 11, 12 must be sealed with respect to the electrolyte, for example by means of pressing or by means of sealing elements, so that the electrical contacting can take place by welding completely on the outer side of the half-shell.

In a second configurational variant, a first half-shell 11 consists of a copper alloy, preferably on the anode side. On the cathode side, a second half-shell 12 consists of an aluminum alloy. As a result, there is no risk of contact corrosion at the contacting point.

FIGS. 4 to 8 show possible variants of how the battery cells 1 can be assembled to form battery cell modules or batteries 100.

FIGS. 4 and 5 thereby show low-cost serial interconnections. The individual battery cells 1 are contacted directly, that is to say no further elements such as cell connectors, cables etc. between the battery cells 1 are required. Instead, the half-shells 11, 12 are welded to one another directly, for example with welds 60 directly on one of the side faces 15 or on the end face 16 of the respective half-shell 11, 12. The transfer resistance between the cells 1 can be improved by conductive paste or the like. Alternatively, a direct connection may take place by way of electrically conductive adhesive at an adhesive-bonding point 70.

FIG. 6 shows a connection variant by means of mechanical connecting elements. Here, the battery cells are screwed or riveted by way of angular elements 80. The battery cell 1 itself has in this case mechanical elements such as studs or recessed nuts/threads. These are preferably integrated in the half-shells 11, 12. Alternatively, the angular elements 80 are already welded-on on one side. The advantage of this configurational variant is the ease with which it can be disassembled in the event of repair or recycling.

FIG. 7 shows an inserted connection variant. Here, the insulating element 20 between the half-shells 11, is extended far enough that it can be inserted directly into the next battery cell 1 or the half-shell 11, 12 thereof. Although engaging mechanisms that prevent unwanted release are not represented, they may be present for fixing the battery cells 1 to one another. The extension 22 represented of the insulating element 20 may be completely integrated in it or flange-mounted on it, for example by means of a screw, snap-in or other mechanical connection. Apart from the fixing of the battery cells 1 to one another, the insulating element 20 also undertakes an insulation with respect to the outside in certain regions of the module 100 thereby produced.

FIG. 8 shows a variant with completely insulated side faces 15. This allows the battery cells 1 to be stacked flush against one another without further insulation with respect to the surroundings. The cell connection takes place by unitary connecting elements, for example welded or screwed connecting elements 50, on uninsulated end faces 16, that is to say on the respective face of a half-shell 11, 12 that is opposite from its open side. The connecting elements 50 may at the same time serve as heat sinks 30.

Figure 10:
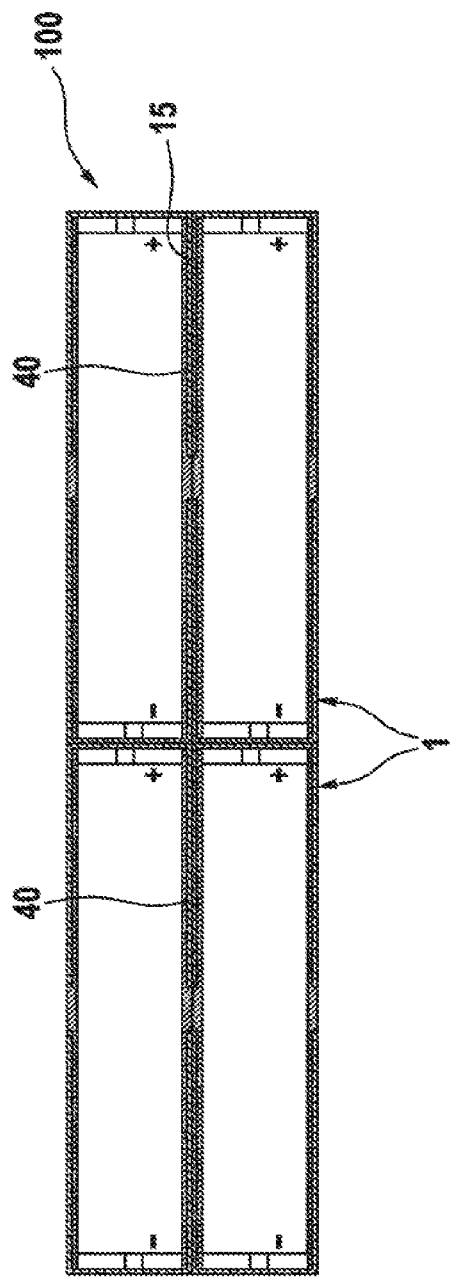
FIG. 10 shows battery cells arranged in series and parallel connection, which are connected by means of a tongue-and-groove connection.

FIGS. 9 and 10 show low-cost parallel-serial interconnections.

In FIG. 9, the battery cells 1 are connected to one another directly by way of their side faces 15, as shown in FIGS. 4 to 6.

In FIG. 10, a plug-in connection that is not depicted in detail is used. A component connection based on a positive connection, such as for example a tongue-and-groove connection 40, may be used here. In this case, grooves may be recessed in the insulating element of one battery cell 1 and be connected to tongues of a further battery cell 1 that are formed in a correspondingly complementary manner.

The contacts between the battery cells 1 may likewise be made in a configuration of a tongue-and-groove form, such as for example as welded-on grooved rails or as welded-on tongues. The grooves and tongues on the half-shells may in principle be provided on each half-shell face, so that the parallel connection can take place on all four side faces 15.

It is evident overall from the figures presented that the external insulation of a battery cell 1 can cover the end faces 16 thereof and/or at least one of the side faces 15, while part of the half-shell 11, 12, to which potential is applied, must always remain uninsulated for the electrical contacting.

The invention claimed is:

1. A battery cell, comprising:
 a housing including a first housing element, a second housing element, and an insulating element positioned between the first and second housing elements so as to electrically insulate the first housing element from the second housing element, the first and second housing elements being formed of conductive materials; and
 at least one electrode assembly in the housing, the electrode assembly including electrodes arranged in more than two layers in a cross section and having a positive pole and a negative pole, the first and second housing elements and the insulating element separating the electrode assembly from the surroundings,
 wherein:
 the first housing element is electrically connected to the positive pole of the electrode assembly so that the first housing element is positively charged and the second housing element is electrically connected to the negative pole of the electrode assembly so that the second housing element is negatively charged such that the battery cell is configured to be electrically contacted on the first housing element and on the second housing element,
 the first housing element and second housing element are respectively configured in the form of a half-shell defining an open side, and the open sides of the respective first and second housing elements are aligned such that the open sides face one another,
 the insulating element is arranged between the half-shells of the housing elements so as to prevent an electrical short-circuit between the first housing element and the second housing element, and
 the housing has a first side face, which includes a portion of the first housing element and a portion of the second housing element, the portion of the first housing element being configured to connect to a negative pole of a first adjacent battery cell, and the portion of the second housing element being configured to connect to a positive pole of a second adjacent battery cell.

2. The battery cell as claimed in claim 1, wherein, the insulating element extends between the first and second housing elements and the electrode assembly to an inner side of each housing element such that the insulating element electrically insulates the first and second housing elements from the electrode assembly.

3. The battery cell as claimed in claim 1, wherein at least one of the first and second housing elements has a heat sink that electrically contacts said at least one of the first and second housing elements.

4. A battery or battery cell module, comprising:
 a plurality of battery cells, each of the battery cells including:
 a housing including a first housing element, a second housing element, and an insulating element positioned between the first and second housing elements so as to electrically insulate the first housing element from the second housing element, the first and second housing elements being formed of conductive materials; and at least one electrode assembly in the housing, the electrode assembly including electrodes arranged in more than two layers in a cross section and having a positive pole and a negative pole, the first and second housing elements and the insulating element separating the electrode assembly from the surroundings, wherein:

the first housing element is electrically connected to the positive pole of the electrode assembly so that the first housing element is positively charged and the second housing element is electrically connected to the negative pole of the electrode assembly so that the second housing element is negatively charged such that the battery cell is configured to be electrically contacted on the first housing element and on the second housing element, the first housing element and second housing element are respectively configured in the form of a half-shell defining an open side, and the open sides of the respective first and second housing elements are aligned such that the open sides face one another, the insulating element is arranged between the half-shells of the housing elements so as to prevent an electrical short-circuit between the first housing element and the second housing element, and the housing of each of the plurality of battery cells has a first side face, which includes a portion of the first housing element and a portion of the second housing element, wherein the portion of the first housing element of a first battery cell of the plurality of battery cells is connected to the second housing element of a first adjacent battery cell of the plurality of battery cells, and the portion of the second housing element of the first battery cell is connected to the first housing element of a second adjacent battery cell of the plurality of battery cells.

5. The battery or battery cell module as claimed in claim 4, wherein:

the portion of the first housing element of the first battery cell is connected to the second housing element of the first adjacent battery cell in an electrically conductive manner by a first material bond; and the portion of the second housing element of the first battery cell is connected to the first housing element of the second adjacent battery cell in an electrically conductive manner by a second material bond.

6. The battery or battery cell module as claimed in claim 4, wherein:

the portion of the first housing element of the first battery cell is connected to the second housing element of the first adjacent battery cell in an electrically conductive manner by one or more of a positive connection and a nonpositive connection; and the portion of the second housing element of the first battery cell is connected to the first housing element of the second adjacent battery cell in an electrically conductive manner by one or more of a positive connection and a nonpositive connection.

7. The battery or battery cell module as claimed in claim 5, wherein the first housing element of the first battery cell and the second housing element of the first adjacent battery cell are connected to one another directly or indirectly.

8. The battery cell as claimed in claim 1, wherein a motor vehicle includes the battery cell.

9. The battery cell as claimed in claim 1, wherein the battery cell is configured as a lithium-ion battery cell.

10. The battery or battery cell module as claimed in claim 6, wherein the first housing element of the first battery cell and the second housing element of the first adjacent battery cell are connected to one another directly or indirectly.

11. The battery or battery cell module as claimed in claim 8, wherein the motor vehicle is configured as an electromotively driven motor vehicle.

12. The battery or battery cell module as claimed in claim 4, wherein a motor vehicle includes the battery or battery module.

13. The battery or battery cell module as claimed in claim 12, wherein the motor vehicle is configured as an electromotively driven motor vehicle.

* * * * *